United States Patent
Yang et al.

(10) Patent No.: US 10,938,748 B2
(45) Date of Patent: Mar. 2, 2021

(54) PACKET PROCESSING METHOD, COMPUTING DEVICE, AND PACKET PROCESSING APPARATUS

(71) Applicant: Huawei Technologies Co., Ltd., Shenzhen (CN)

(72) Inventors: Yongqiang Yang, Beijing (CN); Shaofu Zuo, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 41 days.

(21) Appl. No.: 16/366,597

(22) Filed: Mar. 27, 2019

(65) Prior Publication Data

US 2019/0222538 A1   Jul. 18, 2019

Related U.S. Application Data

(63) Continuation of application No. PCT/CN2016/101381, filed on Sep. 30, 2016.

(51) Int. Cl.
*H04L 12/947* (2013.01)
*H04L 12/751* (2013.01)
(Continued)

(52) U.S. Cl.
CPC .............. *H04L 49/25* (2013.01); *H04L 45/02* (2013.01); *H04L 45/38* (2013.01); *H04L 45/54* (2013.01); *H04L 49/15* (2013.01)

(58) Field of Classification Search
CPC ......... H04L 49/25; H04L 45/02; H04L 45/38; H04L 45/54; H04L 49/15
See application file for complete search history.

(56) References Cited

U.S. PATENT DOCUMENTS 9,167,025 B2   10/2015   Twitchell
10,063,415 B1 *  8/2018   Kanakarajan ....... H04L 41/5054
(Continued)

FOREIGN PATENT DOCUMENTS

CN   1710888 A    12/2005
CN   104283785 A   1/2015
(Continued)

OTHER PUBLICATIONS

Machine Translation and Abstract of Chinese Publication No. CN104283785, Jan. 14, 2015, 12 pages.
(Continued)

*Primary Examiner* — Ivan O Latorre
(74) *Attorney, Agent, or Firm* — Conley Rose, P.C.

(57) ABSTRACT

A packet processing method, including receiving a first packet from a first switch, where the first packet belongs to a service flow that flows from a first device to a second device, determining a service chain through which the service flow passes, determining a forwarding path of the service flow according to the service chain through which the service flow passes, modifying the first packet to obtain a second packet, where the second packet belongs to the service flow, and a valid payload of the second packet includes a valid payload of the first packet and forwarding path indication information, generating a first flow table according to the forwarding path of the service flow, controlling a communications interface to send the first flow table to the first switch, and sending the second packet to the first switch.

20 Claims, 7 Drawing Sheets

(51) Int. Cl.
*H04L 12/721* (2013.01)
*H04L 12/741* (2013.01)
*H04L 12/933* (2013.01)

(56) References Cited

U.S. PATENT DOCUMENTS

| | | | |
|---|---|---|---|
| 10,116,553 B1* | 10/2018 | Penno | H04L 45/306 |
| 2005/0281259 A1 | 12/2005 | Mitchell | |
| 2010/0080226 A1* | 4/2010 | Khalid | H04L 41/5003 |
| | | | 370/392 |
| 2011/0122870 A1* | 5/2011 | Dixon | H04M 15/8214 |
| | | | 370/389 |
| 2014/0010085 A1* | 1/2014 | Kavunder | H04W 28/0215 |
| | | | 370/235 |
| 2014/0050223 A1* | 2/2014 | Foo | H04L 45/74 |
| | | | 370/400 |
| 2014/0226662 A1 | 8/2014 | Frost et al. | |
| 2014/0334295 A1* | 11/2014 | Guichard | H04L 47/2441 |
| | | | 370/230 |
| 2015/0092551 A1* | 4/2015 | Moisand | H04L 67/146 |
| | | | 370/235 |
| 2015/0312142 A1* | 10/2015 | Barabash | H04L 45/26 |
| | | | 370/400 |
| 2015/0319089 A1 | 11/2015 | Liu et al. | |
| 2016/0014016 A1* | 1/2016 | Guichard | H04L 45/64 |
| | | | 709/226 |
| 2016/0164776 A1 | 6/2016 | Biancaniello | |
| 2016/0205015 A1* | 7/2016 | Halligan | H04L 45/04 |
| | | | 370/400 |
| 2016/0226744 A1* | 8/2016 | Al-Zoubi | H04L 41/142 |
| 2016/0261505 A1 | 9/2016 | Saniee et al. | |
| 2017/0012865 A1* | 1/2017 | Nainar | H04L 47/2483 |
| 2017/0085462 A1 | 3/2017 | Zhou et al. | |
| 2017/0149670 A1* | 5/2017 | Backman | H04L 45/64 |
| 2017/0180237 A1* | 6/2017 | Mulka | H04L 45/745 |
| 2017/0237656 A1* | 8/2017 | Gage | H04L 61/2521 |
| | | | 370/392 |
| 2017/0251065 A1* | 8/2017 | Furr | H04L 45/64 |
| 2018/0006935 A1* | 1/2018 | Mutnuru | H04L 12/4633 |
| 2019/0268384 A1* | 8/2019 | Hu | H04L 63/20 |

FOREIGN PATENT DOCUMENTS

| | | |
|---|---|---|
| CN | 105099960 A | 11/2015 |
| CN | 105306368 A | 2/2016 |
| CN | 105591925 A | 5/2016 |
| EP | 2765751 A1 | 8/2014 |
| WO | 2015090240 A1 | 6/2015 |
| WO | 2015149831 A1 | 10/2015 |
| WO | 2015180154 A1 | 12/2015 |
| WO | 2016119600 A1 | 8/2016 |

OTHER PUBLICATIONS

Machine Translation and Abstract of Chinese Publication No. CN105306368, Feb. 3, 2016, 29 pages.
Machine Translation and Abstract of Chinese Publication No. CN105591925, May 18, 2016, 18 pages.
Zhang, H., et al, "Service Chain Header," draft-zhang-sfc-sch-00, Mar. 24, 2014, 15 pages.
Ding, W., et al, "OpenSCaaS: An Open Service Chain as a Service Platform Toward the Integration of SDN and NFV," IEEE Network, vol. 29 , Issue: 3 , May-Jun. 2015, pp. 30-35.
"Service Function Chaining Extension for OpenStack Networking," retrieved from https://docs.openstack.org/networking-sfc/latest/index.html, Jul. 23, 2017, 1 page.
Foreign Communication From a Counterpart Application, PCT Application No. PCT/CN2016/101381, English Translation of International Search Report dated Mar. 21, 2017, 3 pages.
Foreign Communication From a Counterpart Application, European Application No. 16917427.3, Extended European Search Report dated Mar. 27, 2019, 8 pages.
Foreign Communication From a Counterpart Application, Chinese Application No. 201680003591.5, Chinese Notice of Allowance dated Jan. 10, 2020, 4 pages.

\* cited by examiner

PACKET PROCESSING METHOD, COMPUTING DEVICE, AND PACKET PROCESSING APPARATUS

CROSS-REFERENCE TO RELATED APPLICATIONS

This application is a continuation of International Patent Application No. PCT/CN2016/101381 filed on Sep. 30, 2016, which is hereby incorporated by reference in its entirety.

TECHNICAL FIELD

This application relates to the communications field, and in particular, to a packet processing method, a computing device, and a packet processing apparatus.

BACKGROUND

Software-defined networking (SDN) is a network design idea proposed by a Clean Slate research group of Stanford University in the United States. In the OPENFLOW protocol, a core technology of the SDN, control and data planes of a network device are separated, and control of a network is centralized on an SDN controller, thereby shielding a difference between underlying physical forwarding devices, and eliminating a limitation imposed by hardware on a network architecture.

In a forwarding process in an SDN network, a packet may be processed by multiple services, such as a firewall, network address translation (NAT), and load balancing (LB). These services may modify a packet header of the packet. For example, the firewall service may modify a Media Access Control (MAC) address of the packet, and the NAT and LB services may modify the MAC address and 5-tuple information of the packet.

However, once the packet header of the packet is modified, information originally carried in the packet header may be lost. Consequently, the SDN controller cannot identify a forwarding path of the packet, and the packet cannot be normally forwarded.

SUMMARY

This application provides a packet processing method, used by an SDN controller to identify a forwarding path of a packet in order to implement normal forwarding of the packet. This application further provides a related computing device and packet processing apparatus.

A first aspect of this application provides a packet processing method, applied to an SDN controller. The SDN controller receives a first packet sent by a first switch, where the first packet belongs to a service flow that flows from a first device to a second device, and the first device is connected to the first switch. The first device and the second device may be physical hosts or virtual devices. The SDN controller determines a service chain through which the service flow passes, and determines a forwarding path of the service flow according to the service chain through which the service flow passes, where the forwarding path includes one or more service nodes in the service chain. The service node may be a physical host or a virtual device. The SDN controller modifies the first packet to obtain a second packet. Both the second packet and the first packet belong to the service flow, and a valid payload of the second packet includes a valid payload of the first packet and forwarding path indication information. The forwarding path indication information is used to indicate the forwarding path of the service flow. The SDN controller generates a first flow table according to the forwarding path of the service flow, and sends the first flow table to the first switch. Then, the SDN controller sends the second packet to the first switch such that the first switch forwards the second packet according to the first flow table. In this application, the forwarding path indication information of the packet is carried in the valid payload of the packet, and therefore, modifying a packet header of the packet may not cause a loss of the forwarding path indication information. This ensures that the SDN controller can identify the original forwarding path of the packet and deliver the flow table to the switch in order to instruct the switch to forward the packet according to the original forwarding path of the packet.

Optionally, after determining the forwarding path of the service flow, the SDN controller delivers a preset flow table to an intermediate switch in the forwarding path. The intermediate switch is a switch corresponding to one or more non-last-hop service nodes in the service chain. The preset flow table is generated by the SDN controller according to the forwarding path of the service flow, and is used to instruct the intermediate switch to forward the second packet. In this way, after receiving the second packet, the intermediate switch can directly forward the second packet according to the preset flow table delivered by the SDN controller, without a need to further request the SDN controller for a flow table.

Optionally, the SDN controller receives a third packet sent by a second switch. The second switch is one of the intermediate switch, and the third packet is obtained by modifying the second packet by a service node corresponding to the second switch. The third packet and the second packet belong to the same service flow, and a valid payload of the third packet is the same as the valid payload of the second packet. The SDN controller parses the valid payload of the third packet in order to obtain the forwarding path indication information in the valid payload of the third packet, and determines the forwarding path of the service flow according to the forwarding path indication information. The SDN controller generates a second flow table according to the forwarding path of the service flow, and then sends the second flow table to the second switch such that the second switch forwards the third packet according to the second flow table. In this application, the forwarding path indication information of the packet is carried in the valid payload of the packet, and therefore, the SDN controller can identify the original forwarding path of the packet merely by parsing the valid payload of the packet such that the packet can be forwarded according to the original forwarding path.

Optionally, after delivering the second flow table to the second switch, the SDN controller deletes the preset flow table from the second switch.

Optionally, a device list is further set on the SDN controller. The device list lists one or more devices, and the one or more devices modify a MAC address and 5-tuple information of a passing packet. The intermediate switch is not a switch corresponding to a device listed in the device list.

Optionally, after receiving the third packet sent by the second switch, the SDN controller adds the service node corresponding to the second switch into the device list.

Optionally, the SDN controller further receives a fourth packet sent by a third switch, where the third switch is a switch corresponding to a last-hop service node in the service chain. A valid payload of the fourth packet is the same as the valid payload of the second packet, and the fourth packet is obtained by modifying the third packet by one or more service nodes, and therefore, the fourth packet and the third packet belong to the same service flow. The SDN controller parses the valid payload of the fourth packet in order to obtain the forwarding path indication information carried in the valid payload of the fourth packet. The SDN controller determines the forwarding path of the service flow according to the forwarding path indication information, generates a third flow table according to the determined forwarding path, and sends the third flow table to the third switch. After obtaining the forwarding path indication information carried in the valid payload of the fourth packet, the SDN controller further deletes the forwarding path indication information from the valid payload of the fourth packet in order to obtain a fifth packet, and then sends the fifth packet to the third switch such that the third switch forwards the fifth packet according to the third flow table. In this application, the forwarding path indication information of the packet is carried in the valid payload of the packet such that the SDN controller can identify the forwarding path of the packet by parsing the valid payload of the packet. In this way, the SDN controller can deliver the flow table to the switch in order to instruct the switch to forward the packet according to the original forwarding path of the packet. In addition, the SDN controller restores the valid payload of the packet in the last hop of the service chain such that the original valid payload of the packet can be forwarded to a destination.

Optionally, a length of the forwarding path indication information is M bytes. When modifying the first packet, the SDN controller extends M bytes at an end of the valid payload of the first packet, and fills the forwarding path indication information into the extended M bytes in order to obtain the second packet.

Optionally, a length of the forwarding path indication information is M bytes. When modifying the first packet, the SDN controller fills the forwarding path indication information into M bytes at an end of the valid payload of the first packet in order to obtain the second packet.

Optionally, the forwarding path indication information includes identity information of the service chain of the service flow.

Optionally, the forwarding path indication information further includes a tenant identity of the service flow.

Optionally, the forwarding path indication information further includes 5-tuple information of the service flow.

Optionally, when modifying the first packet, the SDN controller further modifies a destination MAC address of the first packet to a MAC address of a first-hop service node in the service chain.

Optionally, when modifying the fourth packet, the SDN controller further modifies a destination MAC address of the fourth packet to a MAC address of the second device.

Optionally, the SDN controller further stores a layer 7 node list. The layer 7 node list records one or more layer 7 service nodes. The layer 7 service node is a service node that bears a layer 7 service. A switch corresponding to a previous-hop service node of the layer 7 service node is referred to as a previous-hop switch. The intermediate switch is not the previous-hop switch. The SDN controller receives a first target packet sent by the previous-hop switch, where the first target packet belongs to the service flow, and a valid payload of the first target packet is the same as the valid payload of the second packet. The SDN controller parses the valid payload of the first target packet in order to obtain the forwarding path indication information carried in the valid payload. The SDN controller determines the forwarding path of the service flow according to the forwarding path indication information, generates a target flow table according to the forwarding path of the service flow, and sends the target flow table to the previous-hop switch. The SDN controller deletes the forwarding path indication information from the valid payload of the first target packet in order to obtain a second target packet. The SDN controller sends the second target packet to the previous-hop switch such that the previous-hop switch forwards the second target packet according to the target flow table.

A second aspect of this application provides a computing device, including a processor, a memory, and a communications interface. By invoking program code stored in the memory, the processor is configured to perform the packet processing method provided in the first aspect of this application.

A third aspect of this application provides a packet processing apparatus, including a communication module and a processing module. The communication module is configured to receive a first packet sent by a first switch, where the first packet belongs to a service flow that flows from a first device to a second device, and the first device is connected to the first switch. The first device and the second device may be physical hosts or virtual devices. The processing module is configured to determine a service chain through which the service flow passes, and determine a forwarding path of the service flow according to the service chain through which the service flow passes, where the forwarding path includes one or more service nodes in the service chain, and the service node may be a physical host or a virtual device, modify the first packet to obtain a second packet, where both the second packet and the first packet belong to the service flow, a valid payload of the second packet includes a valid payload of the first packet and forwarding path indication information, and the forwarding path indication information is used to indicate the forwarding path of the service flow, and generate a first flow table according to the forwarding path of the service flow, and send the first flow table to the first switch. The communication module is further configured to send the second packet to the first switch such that the first switch forwards the second packet according to the first flow table.

Optionally, after the processing module determines the forwarding path of the service flow, the communication module is further configured to deliver a preset flow table to an intermediate switch in the forwarding path. The intermediate switch is a switch corresponding to one or more non-last-hop service nodes in the service chain. The preset flow table is generated by the processing module according to the forwarding path of the service flow, and is used to instruct the intermediate switch to forward the second packet. In this way, after receiving the second packet, the intermediate switch can directly forward the second packet according to the preset flow table delivered by the communication module, without a need to further request an SDN controller for a flow table.

Optionally, the communication module is further configured to receive a third packet sent by a second switch. The second switch is one of the intermediate switch, and the third packet is obtained by modifying the second packet by a service node corresponding to the second switch. The third packet and the second packet belong to the same service flow, and a valid payload of the third packet is the same as the valid payload of the second packet. The processing module is further configured to parse the valid payload of the third packet in order to obtain the forwarding path indication information in the valid payload of the third packet, and determine the forwarding path of the service flow according to the forwarding path indication information, and generate a second flow table according to the forwarding path of the service flow. The communication module is further configured to send the second flow table to the second switch such that the second switch forwards the third packet according to the second flow table.

Optionally, after the communication module delivers the second flow table to the second switch, the processing module is further configured to delete the preset flow table from the second switch.

Optionally, a device list is set on the packet processing apparatus. The device list lists one or more devices, and the one or more devices modify a MAC address and 5-tuple information of a passing packet. The intermediate switch is not a switch corresponding to a device listed in the device list.

Optionally, after receiving the third packet sent by the second switch, the processing module is further configured to add the service node corresponding to the second switch into the device list.

Optionally, the communication module is further configured to receive a fourth packet sent by a third switch, where the third switch is a switch corresponding to a last-hop service node in the service chain. A valid payload of the fourth packet is the same as the valid payload of the second packet, and the fourth packet is obtained by modifying the third packet by one or more service nodes, and therefore, the fourth packet and the third packet belong to the same service flow. The processing module is further configured to parse the valid payload of the fourth packet in order to obtain the forwarding path indication information carried in the valid payload of the fourth packet, and determine the forwarding path of the service flow according to the forwarding path indication information, and generate a third flow table according to the determined forwarding path. The communication module is further configured to send the third flow table to the third switch. The processing module is further configured to delete the forwarding path indication information from the valid payload of the fourth packet in order to obtain a fifth packet. The communication module is further configured to send the fifth packet to the third switch such that the third switch forwards the fifth packet according to the third flow table.

Optionally, a length of the forwarding path indication information is M bytes. The processing module is further configured to extend M bytes at an end of the valid payload of the first packet, and fill the forwarding path indication information into the extended M bytes in order to obtain the second packet.

Optionally, a length of the forwarding path indication information is M bytes. The processing module is further configured to fill the forwarding path indication information into M bytes at an end of the valid payload of the first packet in order to obtain the second packet.

Optionally, the forwarding path indication information includes identity information of the service chain of the service flow.

Optionally, the forwarding path indication information further includes a tenant identity of the service flow.

Optionally, the forwarding path indication information further includes 5-tuple information of the service flow.

Optionally, when modifying the first packet, the processing module is further configured to modify a destination MAC address of the first packet to a MAC address of a first-hop service node in the service chain.

Optionally, when modifying the fourth packet, the processing module is further configured to modify a destination MAC address of the fourth packet to a MAC address of the second device.

Optionally, the packet processing apparatus further stores a layer 7 node list. The layer 7 node list records one or more layer 7 service nodes. The layer 7 service node is a service node that bears a layer 7 service. A switch corresponding to a previous-hop service node of the layer 7 service node is a previous-hop switch. The intermediate switch is not the previous-hop switch. The communication module is further configured to receive a first target packet sent by the previous-hop switch, where the first target packet belongs to the service flow, and a valid payload of the first target packet is the same as the valid payload of the second packet. The processing module is further configured to parse the valid payload of the first target packet in order to obtain the forwarding path indication information carried in the valid payload, and determine the forwarding path of the service flow according to the forwarding path indication information, and generate a target flow table according to the forwarding path of the service flow. The communication module is further configured to send the target flow table to the previous-hop switch. The processing module is further configured to delete the forwarding path indication information from the valid payload of the first target packet in order to obtain a second target packet. The communication module is further configured to send the second target packet to the previous-hop switch such that the previous-hop switch forwards the second target packet according to the target flow table.

A fourth aspect of this application provides a computer program product. The computer program product may be a software installation package. When a computing device runs the software installation package, the packet processing method provided in the first aspect of this application is performed.

A fifth aspect of this application provides a storage medium. The storage medium stores program code. When a computing device runs the program code, the packet processing method provided in the first aspect of this application is performed. The storage medium includes but is not limited to a flash memory, a hard disk drive (HDD), or a solid state drive (SSD).

DESCRIPTION OF EMBODIMENTS

This application provides a packet processing method, used by an SDN controller to identify a forwarding path of a packet in order to implement normal forwarding of the packet. This application further provides a related computing device and packet processing apparatus, which are separately described below.

Figure 1:
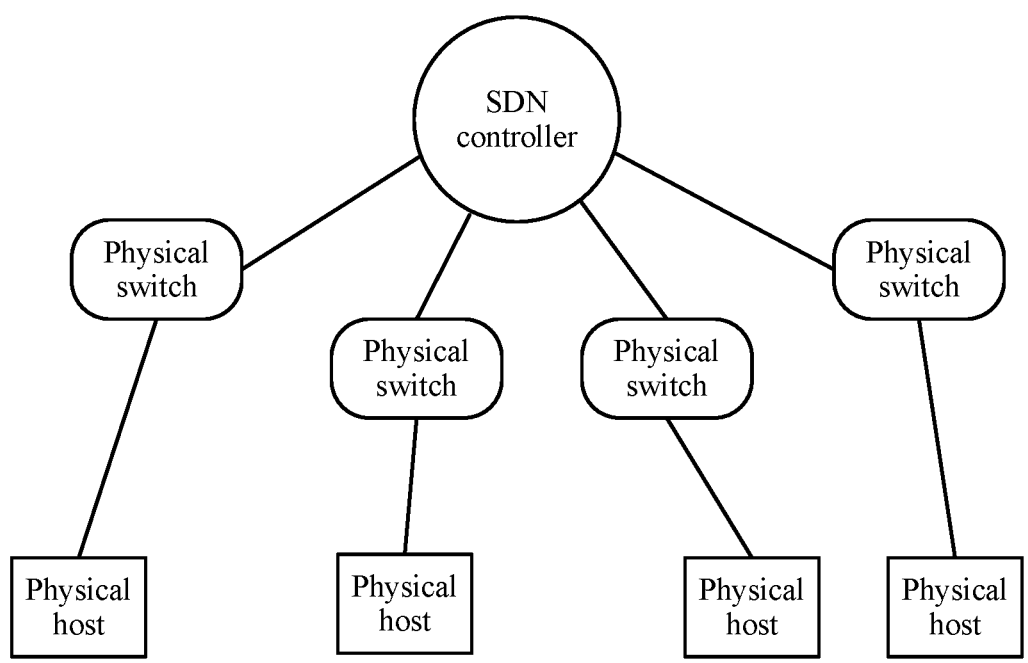
FIG. 1 is a networking mode of an SDN network.
Figure 2:
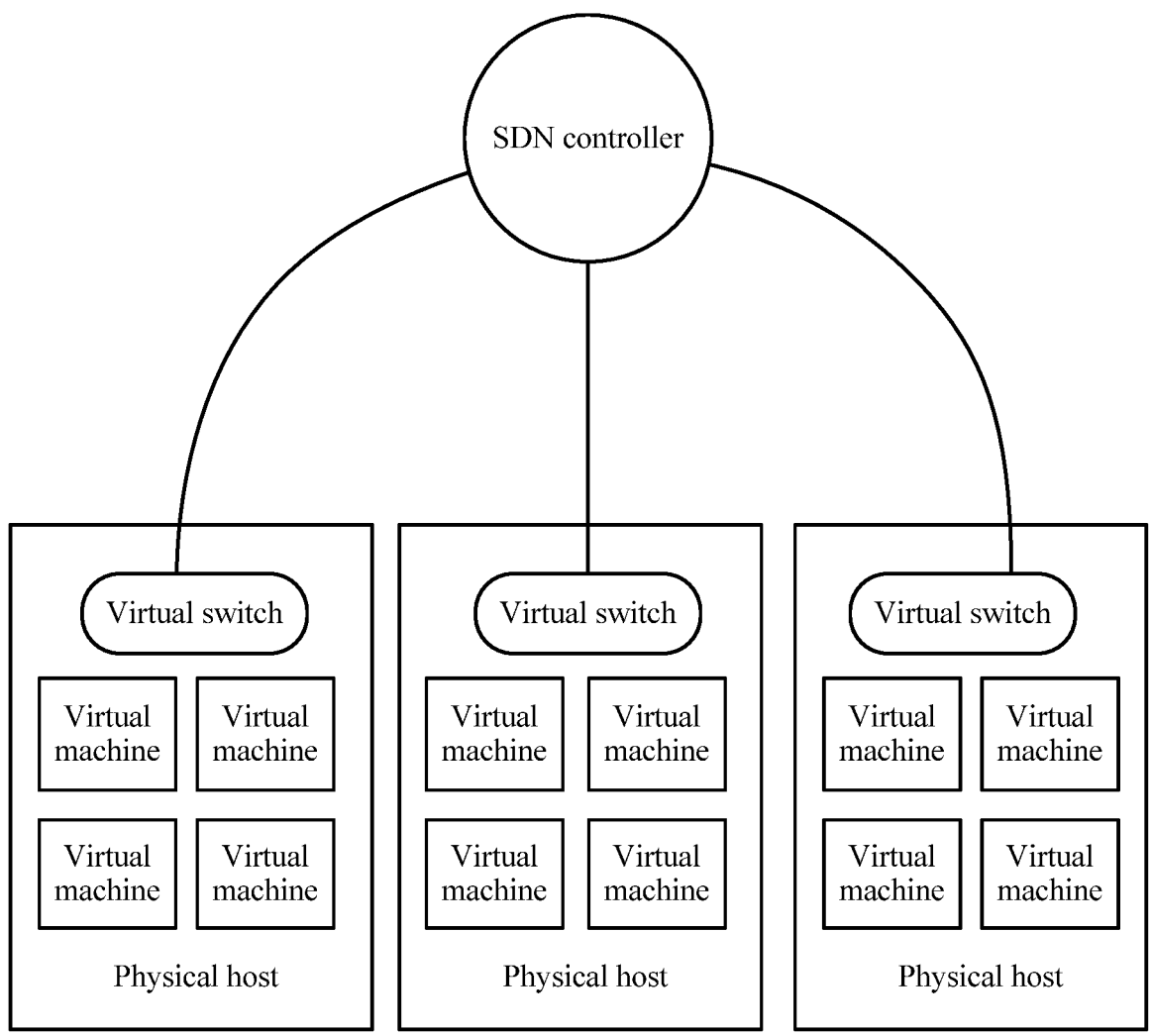
FIG. 2 is another networking mode of an SDN network.

There are multiple combination modes of an SDN network. For example, FIG. 1 shows a networking mode of a physical host plus a physical switch. The SDN network includes multiple physical hosts, and physical switches that are connected to the multiple physical hosts and configured to forward packets of the multiple physical hosts. FIG. 2 is a networking mode of a virtual device plus a virtual switch (also referred to as VS). The SDN network includes multiple physical hosts, and multiple virtual devices, such as virtual machines (also referred to as VM) or containers, are disposed on each physical host. A virtual switch is further disposed to forward packets of the multiple virtual machines. There may be another networking mode of the SDN network, such as networking that is of a virtual machine plus a physical switch and that is implemented using a straight-through network interface card technology, or hybrid networking implemented using a physical host plus a physical switch or a virtual device plus a virtual switch.

In a forwarding process in the SDN network, a packet may be processed by multiple services, such as a firewall, NAT, and LB. Generally, traffic in the SDN network is classified into one or more service flows according to a service. Throughout this specification, one service flow includes a series of packets. The series of packets are sent by a same source device to a same destination device. When packets belonging to a same service flow are sent by a source device, packet headers carry same 5-tuple information (a source Internet Protocol (IP) address, a destination IP address, a source port number, a destination port number, and a protocol type). The packets belonging to a same service flow have a same forwarding path. A service sequence through which a service flow passes is referred to as a service chain through which the service flow passes. For example, if a packet belonging to a service flow is successively processed by a firewall service, a NAT service, and an LB service in a forwarding process, firewall-NAT-LB is a service chain through which the service flow passes.

A service processing task of a packet is borne on a device in the SDN network. The device may be an entity device (that is, a physical host), or may be a virtual device (that is, a VM). One device may bear multiple services, and one service may be borne on multiple devices. Generally, after determining a service chain of a packet, the SDN controller specifies a device configured to bear each service in the service chain. The specified device is referred to as a service node (also referred to as SN). A sequence of service nodes in the service chain is a forwarding path of the packet.

If the service nodes are classified according to a service that is borne, the service nodes may be classified into at least three types. A service borne on a first type of service node, such as a layer 2 firewall or an intrusion prevention system (IPS), is used only to check and filter packets, and does not perform any modification on packet headers. A service borne on a second type of service node, such as a layer 3 firewall or a router, modifies a source MAC address of a packet, and therefore, a source MAC address of a packet passing through the second type of service node is changed. A service borne on a third type of service node, such as an LB service or a NAT service, modifies a MAC address and 5-tuple information of a packet, and therefore, both a MAC address and 5-tuple information of a packet passing through the third type of service node are changed.

Figure 3:
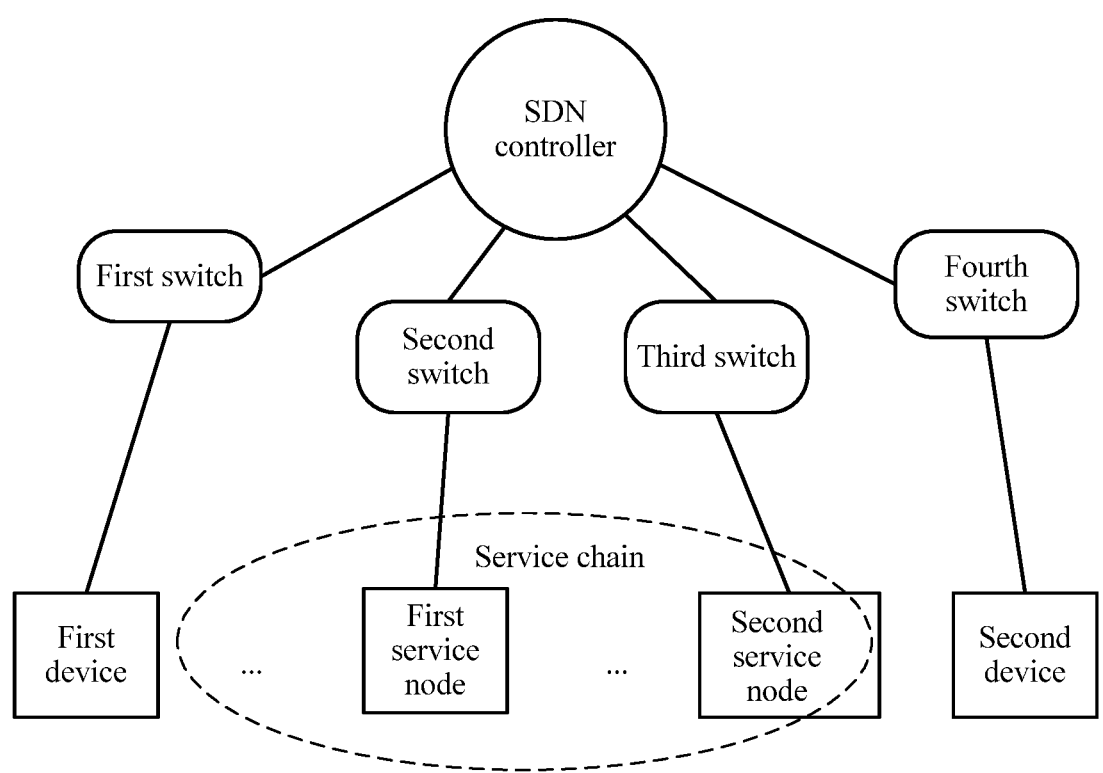
FIG. 3 is a schematic diagram of a service chain in an SDN network.

FIG. 3 is a schematic diagram of a service chain in an SDN network. An actual networking structure of the SDN network is not shown, but a connection relationship between a switch and a service node is shown. In FIG. 3, each switch may be a physical switch or a virtual switch, and each service node may be a physical host or a virtual machine. A service flow flows from a first device to a second device. The first device and the second device may be entity devices or virtual devices. A service chain through which the service flow passes includes N service nodes, which are successively referred to as a first-hop service node, a second-hop service node, . . . , and an $N^{th}$-hop service node according to a packet passing sequence, where N is a positive integer. The first service node is a service node in the first-hop service node to an $(N-1)^{th}$-hop service node. The second service node is the $N^{th}$-hop service node (that is, a last-hop service node). Another service node in the service chain is omitted and not shown in FIG. 3.

A switch in the SDN network forwards a packet according to a flow table. The flow table includes a match field and an execution field. The match field includes a match condition, used to determine whether the flow table matches the packet. The match condition is generally in a form of 5-tuple information, or may be in another form. The execution field is used to indicate a specific forwarding action to be performed on the packet. In FIG. 3, the first device sends an initial packet of the service flow. After receiving the initial packet of the service flow, a first switch initially searches locally stored flow tables for a flow table that matches the initial packet, and if no matched flow table is locally found, sends the initial packet to an SDN controller. The SDN controller determines, according to the service chain through which the service flow passes, that a forwarding path of the service flow is first device-N service nodes-second device, and therefore, delivers a flow table to a switch connected to the first device such that the switch connected to the first device forwards the initial packet according to the delivered flow table.

In addition, in a technology in a current stage, identity information of the service chain is further carried in a source MAC address of a packet such that the SDN controller can make the identity information of the service chain be corresponding to the forwarding path. When switches connected to the N service nodes subsequently send the packet to the SDN controller to request a flow table, the SDN controller can determine the forwarding path according to the identity information that is of the service chain and that is carried in the source MAC address of the packet, and deliver a flow table to the switches connected to the N service nodes.

However, carrying the identity information of the service chain in the source MAC address is not universally applicable. For example, either the second type of service node or the third type of service node may modify the source MAC address of the packet, and this operation may cause a loss of the identity information that is of the service chain and that is carried in the source MAC address. Consequently, the SDN controller cannot determine the forwarding path of the packet. The SDN controller discards the packet, or specifies a new forwarding path for the packet. Therefore, in the technology in the current stage, if a service flow passes through the second or third type of service node, a packet belonging to the service flow cannot be forwarded according to a forwarding path of the packet.

To resolve the foregoing problem, based on the service chain shown in FIG. 3, this application provides a packet processing method. For a basic process of the packet processing method, refer to FIG. 4A to FIG. 4C.

1. For processing of a first packet sent by a first device, refer to FIG. 4A.

Step 401. The first device sends the first packet to a first switch.

Only the service chain shown in FIG. 3 is used as an example for description in this embodiment. A service flow flows from the first device to a second device. An initial packet of the service flow is the first packet, and is sent to the connected first switch by the first device.

Step 402. The first switch sends the first packet to an SDN controller.

Because the first packet is the initial packet of the service flow, the first switch has no flow table that matches the first packet. The first switch sends the first packet to the SDN controller, and the SDN controller receives the first packet.

Step 403. The SDN controller determines a forwarding path of a service flow.

The SDN controller determines, according to 5-tuple information or the like in a packet header of the first packet, the service flow to which the first packet belongs, determines a service chain through which the service flow passes, and specifies that N service nodes of the service chain are a first-hop service node to an $N^{th}$-hop service node. Therefore, the obtained forwarding path of the service flow includes first device-N service nodes-second device.

Step 404. The SDN controller modifies the first packet to a second packet.

The SDN controller adds forwarding path indication information into a valid payload of the first packet such that the first packet becomes the second packet. A valid payload of the second packet includes the valid payload of the first packet and the forwarding path indication information.

The forwarding path indication information is used to correspond to the forwarding path of the service flow. The forwarding path indication information has many forms. In some embodiments of this application, the forwarding path indication information is identity information of the service chain through which the service flow passes. If an identity of the service chain is not globally unique, the forwarding path indication information may further include tenant identity information of the service flow. In addition, the forwarding path indication information may further include 5-tuple information of the service flow. Alternatively, the forwarding path indication information may be in another form, provided that the SDN controller can uniquely obtain, according to the forwarding path indication information, the forwarding path determined in step 403.

There are many methods for adding the forwarding path indication information into the valid payload of the first packet by the SDN controller. It is assumed that a length of the forwarding path indication information is M bytes. Optionally, if a length of the valid payload of the first packet is still not greater than a maximum transmission unit (MTU) of a network after being increased by M bytes, the SDN controller may extend M bytes at an end of the valid payload of the first packet, and fill the forwarding path indication information into the extended M bytes. The second packet obtained in this way includes the whole valid payload of the first packet. Further optionally, the SDN controller may directly fill the forwarding path indication information into M bytes at an end of the valid payload of the first packet. In this way, the second packet includes the valid payload of the first packet except for the M bytes at the end. Alternatively, the SDN controller may add the forwarding path indication information into the valid payload of the first packet in another manner in order to obtain the second packet. This is not limited in this application.

The second packet is obtained by modifying the first packet, and compared with the packet header of the first packet, a packet header of the second packet is not modified. Therefore, the second packet and the first packet belong to the same service flow.

Step 405. The SDN controller generates a first flow table, and sends the first flow table to the first switch.

The SDN controller generates the first flow table according to the determined forwarding path of the service flow, and delivers the first flow table to the first switch. A match field in the first flow table matches the second packet.

A sequence between step 404 and step 405 is not limited in this embodiment, and step 405 may be performed before step 404.

Step 406. The SDN controller sends the second packet to the first switch.

Step 407. The first switch forwards the second packet according to the first flow table.

After receiving the first flow table and the second packet, the first switch determines that the first flow table matches the second packet, and therefore, forwards the second packet according to an indication of an execution field in the first flow table such that the second packet is forwarded to a first-hop service node.

Figure 4A:
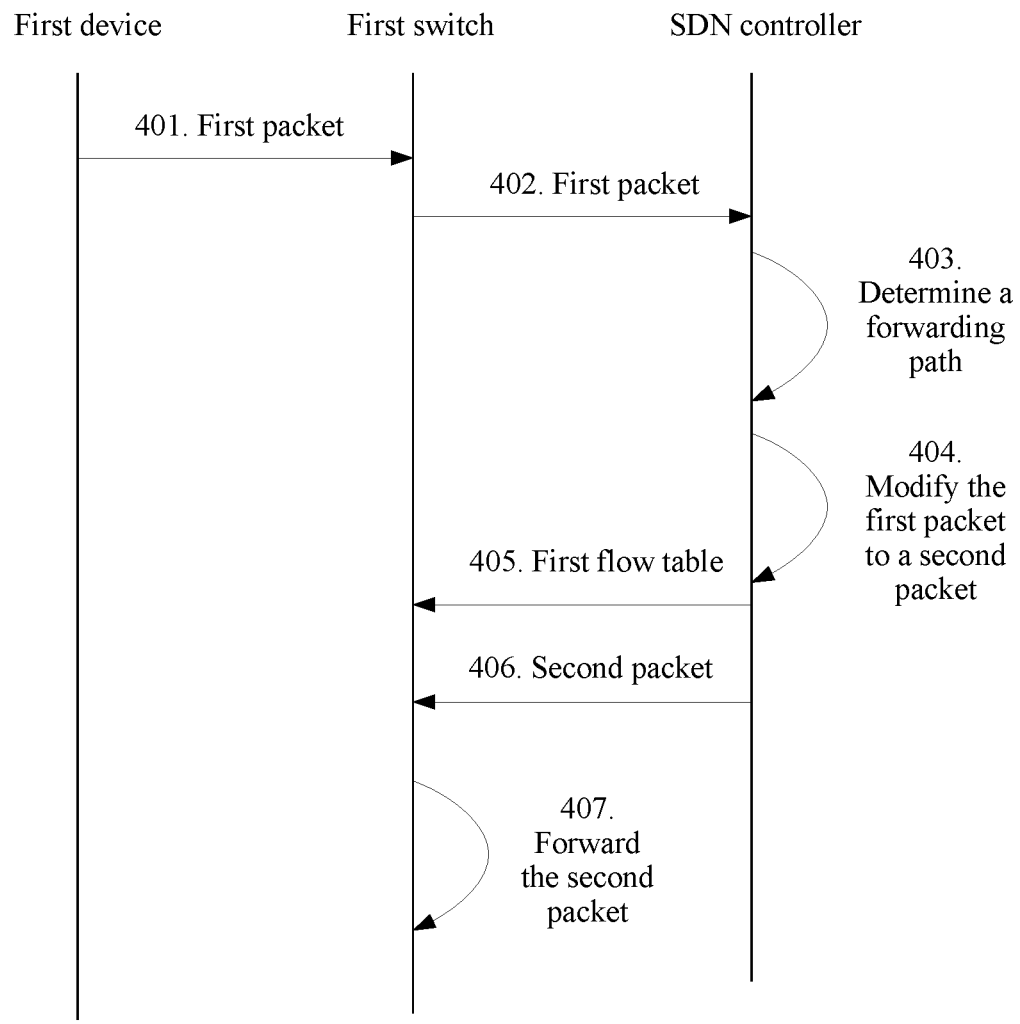
FIG. 4A is a flowchart of an embodiment of a packet processing method according to this application.

It may be learned from steps 401 to 407 shown in FIG. 4A that the forwarding path indication information of the packet is carried in the valid payload of the packet in this application. A second type of service node and a third type of service node modify only a packet header of a packet, and do not modify a valid payload of the packet. Therefore, the forwarding path indication information carried in the packet in this application may not be lost. This ensures that the SDN controller can identify the original forwarding path of the packet and deliver the flow table to the switch in order to instruct the switch to forward the packet according to the original forwarding path of the packet.

Optionally, after determining the forwarding path of the service flow in step 403, the SDN controller may further deliver a preset flow table to an intermediate switch. The intermediate switch is a switch connected to a non-last-hop service node in the forwarding path. For example, a second switch in FIG. 3 is an intermediate switch. The preset flow table is generated by the SDN controller according to the forwarding path, and is used to instruct the intermediate switch to forward the second packet. A match field in the preset flow table matches the second packet. In this way, after receiving the second packet, the intermediate switch can directly forward the second packet according to the preset flow table delivered by the SDN controller, without a need to further request the SDN controller for a flow table.

It is worth pointing out that the third type of service node modifies a MAC address and the 5-tuple information of the packet, and consequently, a modified packet cannot match the preset flow table. Therefore, optionally, the SDN controller may further include a device list. The device list lists multiple devices, and the multiple devices are the third type of service nodes that have been identified by the SDN controller. Before delivering the preset flow table to the intermediate switch, the SDN controller further determines a specific scope of the intermediate switch. The intermediate switch is not a switch corresponding to a device listed in the device list. In this way, the SDN controller does not deliver the preset flow table to a switch corresponding to an identified third type of service node such that performance of the SDN controller can be improved.

Optionally, when modifying the first packet in step 404, the SDN controller may further modify a MAC address of the first packet to a MAC address of the first-hop service node in the service chain in order to obtain the second packet. In this way, when forwarding the second packet, the first switch does not need to perform a related operation of modifying a MAC address of the second packet.

2. For processing of the second packet sent by a first service node, refer to FIG. 4B.

Step 408. The first service node sends a third packet to a second switch.

That the first service node is the third type of service node is used as an example for description in this embodiment. After the second packet passes through the first service node, both the MAC address and 5-tuple information in the packet header are modified by the first service node, and the second packet becomes the third packet. Compared with the valid payload of the second packet, a valid payload of the third packet is not modified. Therefore, valid payloads of the third packet and the second packet are the same, and both include the valid payload of the first packet and the forwarding path indication information.

Although packet headers of the third packet and the second packet are different, the third packet is obtained by modifying the second packet, and therefore, the third packet and the second packet still belong to the same service flow.

Step 409. The second switch sends the third packet to the SDN controller.

The second switch has no flow table that matches the third packet. The second switch sends the third packet to the SDN controller, and the SDN controller receives the third packet.

Step 410. The SDN controller determines the forwarding path.

The SDN controller parses the valid payload of the third packet in order to obtain the forwarding path indication information in the valid payload of the third packet. The SDN controller determines, according to the forwarding path indication information, the forwarding path of the service flow to which the third packet belongs.

Step 411. The SDN controller generates a second flow table, and sends the second flow table to the second switch.

The SDN controller generates the second flow table according to the determined forwarding path of the service flow, and delivers the second flow table to the second switch. A match field in the second flow table matches the third packet.

Step 412. The second switch forwards the third packet according to the second flow table.

After receiving the second flow table, the second switch determines that the second flow table matches the third packet, and therefore, forwards the third packet according to an indication of an execution field in the second flow table such that the third packet is forwarded to a next-hop service node of the first service node.

Figure 4B:
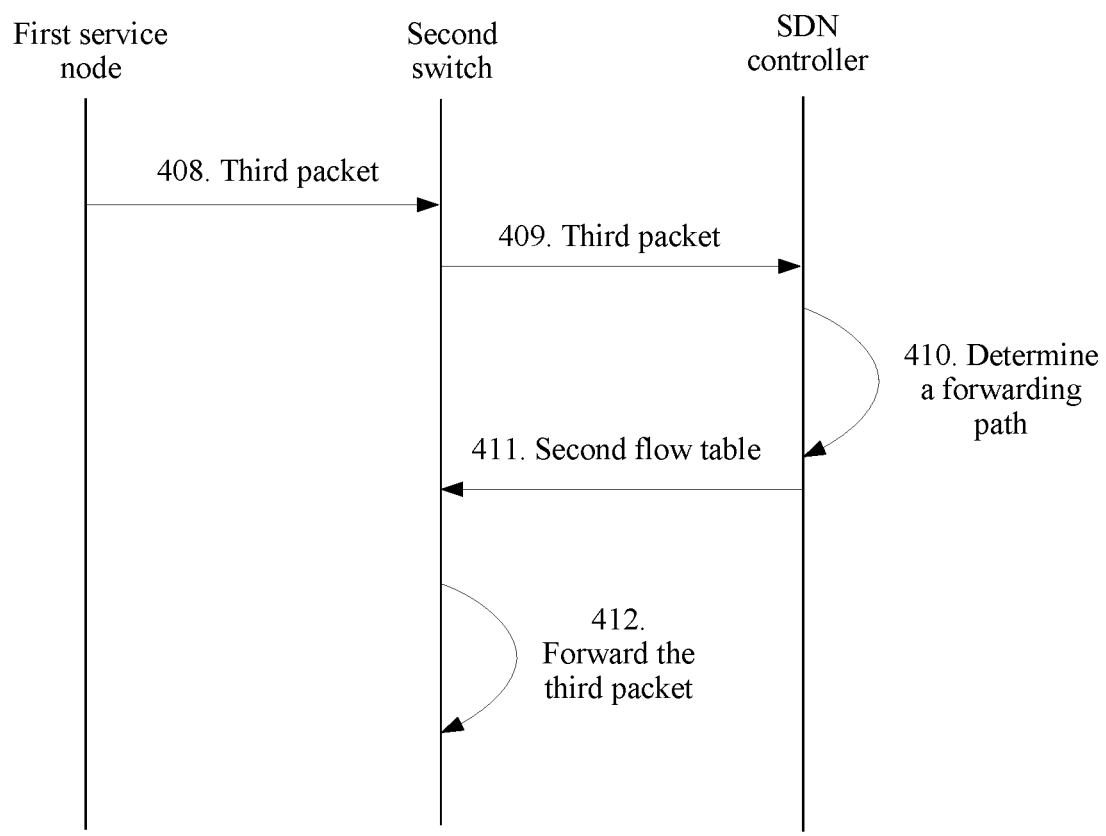
FIG. 4B is a flowchart of another embodiment of a packet processing method according to this application.

It may be learned from steps 408 to 412 shown in FIG. 4B that the forwarding path indication information of the packet is carried in the valid payload of the packet in this application. The SDN controller can identify the original forwarding path of the packet merely by parsing the valid payload of the packet such that the packet can be forwarded according to the original forwarding path.

It is mentioned in step 409 that the second switch has no flow table that matches the third packet. There may be the following three specific cases.

Case 1: The SDN controller does not perform the operation of delivering the preset flow table to the intermediate switch. In this case, the first service node may be any one of the first to the third types of service nodes. That the first service node belongs to the third type of service node is used only as an example for description in this application.

Case 2: The SDN controller performs the operation of delivering the preset flow table to the intermediate switch, but does not deliver the preset flow table to the second switch because the SDN controller has identified that the first service node is the third type of service node.

Case 3: The SDN controller delivers the preset flow table to the second switch, but the first service node is the third type of service node that is not identified by the SDN controller. The second packet becomes the third packet after passing through the first service node, and cannot match the preset flow table delivered by the SDN controller because the packet header is changed. Optionally, in this case, the SDN controller may delete the preset flow table from the second switch, and add the first service node into the device list in order to identify the first service node as the third type of service node.

3. For processing of a fourth packet sent by a second service node, refer to FIG. 4C.

Step 413. The second service node sends the fourth packet to a third switch.

As shown in FIG. 3, the second service node is a last-hop service node in the service chain, and the third switch is a switch connected to the second service node.

The fourth packet may be the same as the third packet, or may be obtained by modifying the third packet for one or more times. For example, if service nodes between the first service node and the second service node (excluding the first service node and including the second service node) in the service chain are all the second type of service nodes, the fourth packet is the same as the third packet. If there is the second or third type of service node between the first service node and the second service node (excluding the first service node and including the second service node) in the service chain, packet headers of the fourth packet and the third packet are different, but valid payloads are the same, and both include the valid payload of the first packet and the forwarding path indication information.

Although the packet headers of the fourth packet and the third packet are different, the fourth packet is obtained by modifying the third packet, and therefore, the fourth packet and the third packet still belong to the same service flow.

Step 414. The third switch sends the fourth packet to the SDN controller.

The fourth packet is obtained by modifying the initial packet of the service flow for one or more times, and the SDN controller does not deliver the preset flow table to the third switch. Therefore, the third switch has no flow table that matches the fourth packet. The third switch sends the fourth packet to the SDN controller, and the SDN controller receives the fourth packet.

Step 415. The SDN controller determines the forwarding path.

The SDN controller parses a valid payload of the fourth packet in order to obtain the forwarding path indication information in the valid payload of the fourth packet. The SDN controller determines, according to the forwarding path indication information, the forwarding path of the service flow to which the fourth packet belongs, that is, the SDN controller determines to forward the fourth packet to the second device.

Step 416. The SDN controller modifies the fourth packet to a fifth packet.

The SDN controller deletes the forwarding path indication information from the valid payload of the fourth packet in order to obtain the fifth packet. A valid payload of the fifth packet includes the valid payload of the first packet.

The SDN controller modifies the fourth packet to the fifth packet, and the valid payload of the obtained fifth packet should be the same as the valid payload of the first packet. For example, if in step 404, the SDN controller extends M bytes at the end of the valid payload of the first packet and fills the forwarding path indication information into the extended M bytes, in step 416, the SDN controller deletes M bytes at an end of the valid payload of the fourth packet such that the valid payload of the fifth packet is the same as the valid payload of the first packet. For another example, if in step 404, the SDN controller retains original content of M bytes at the end of the valid payload of the first packet and fills the forwarding path indication information into the M bytes at the end of the valid payload of the first packet, in step 416, the SDN controller fills the original content of the M bytes at the end of the valid payload of the first packet into M bytes at an end of the valid payload of the fourth packet such that the valid payload of the fifth packet is the same as the valid payload of the first packet.

Step 417. The SDN controller generates a third flow table, and sends the third flow table to the third switch.

The SDN controller generates the third flow table according to the determined forwarding path of the service flow, and delivers the third flow table to the third switch. A match field in the third flow table matches the fifth packet.

Step 418. The SDN controller sends the fifth packet to the third switch.

Step 419. The third switch forwards the fifth packet according to the third flow table.

After receiving the third flow table and the fifth packet, the third switch determines that the third flow table matches the fifth packet, and therefore, forwards the fifth packet according to an indication of an execution field in the third flow table such that the fifth packet is forwarded to the second device.

Figure 4C:
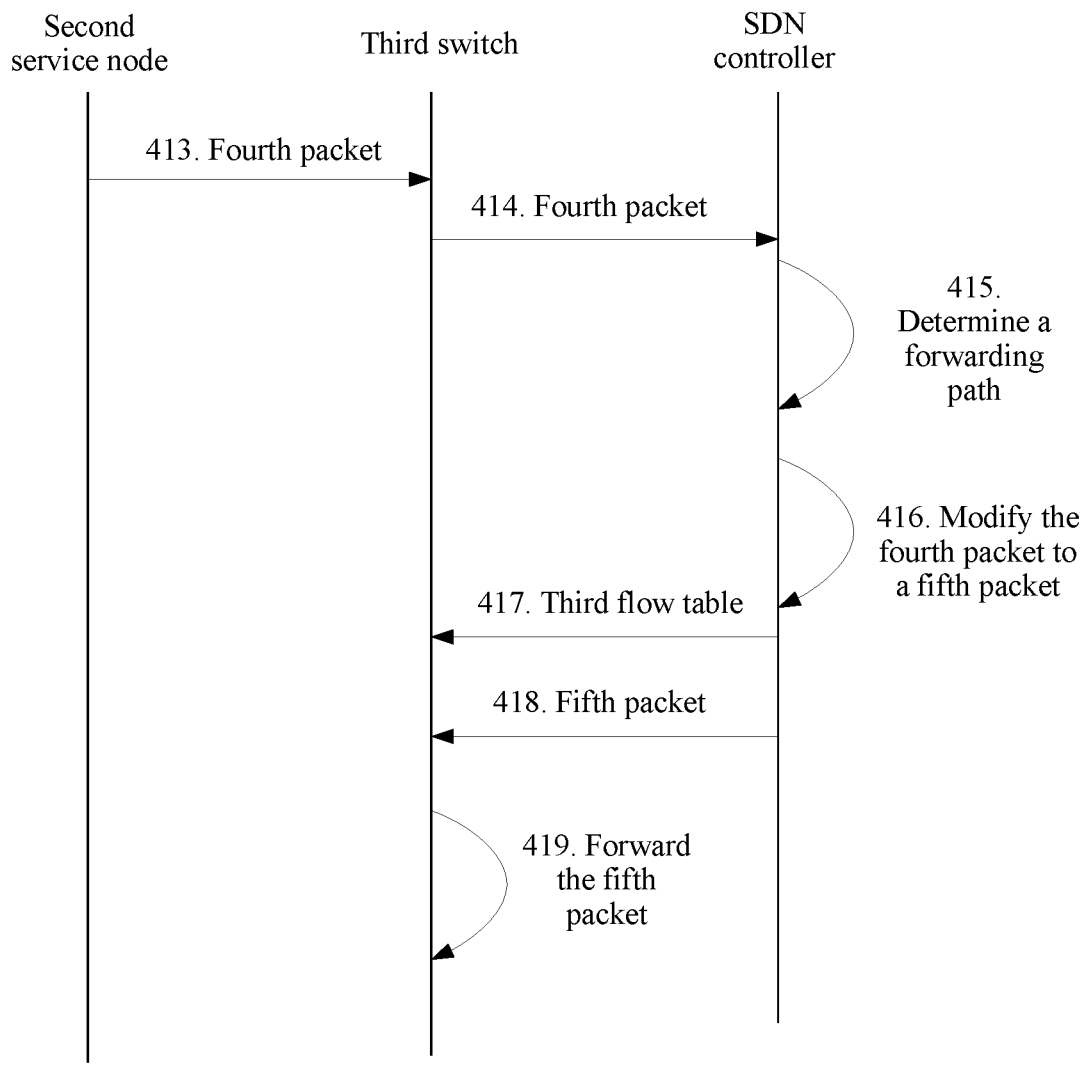
FIG. 4C is a flowchart of another embodiment of a packet processing method according to this application.

It may be learned from steps 413 to 419 shown in FIG. 4C that the forwarding path indication information of the packet is carried in the valid payload of the packet in this application. The SDN controller can identify the original forwarding path of the packet merely by parsing the valid payload of the packet. In this way, the SDN controller can deliver the flow table to the switch in order to instruct the switch to forward the packet according to the original forwarding path of the packet. In addition, the SDN controller restores the valid payload of the packet in the last hop of the service chain such that the original valid payload of the packet can be forwarded to a destination.

Optionally, when modifying the fourth packet in step 416, the SDN controller may further modify a MAC address of the fourth packet to a MAC address of the second device in order to obtain the fifth packet. In this way, when forwarding the fifth packet, the third switch does not need to perform a related operation of modifying a MAC address of the fifth packet.

It should be pointed out that some services in an SDN network are layer 7 services. A valid payload of a packet needs to be used in the layer 7 services. Therefore, when a packet enters a service node that bears a layer 7 service, a valid payload of the packet needs to be restored. Therefore, optionally, in some embodiments of this application, the SDN controller further identifies a service node that bears a layer 7 service (for ease of description, referred to as a layer 7 service node below) in the service chain, and does not deliver the preset flow table to a switch connected to a previous-hop service node of the layer 7 service node. When the switch connected to the previous-hop service node of the layer 7 service node (for ease of description, referred to as a previous-hop switch below) sends a packet to the SDN controller to request a flow table, the SDN controller delivers a flow table to the previous-hop switch, deletes the forwarding path indication information from the valid payload of the packet, and then sends a packet to the previous-hop switch such that the previous-hop switch forwards the packet from which the forwarding path indication information is deleted to the layer 7 service node.

The embodiment shown in FIG. 4A to FIG. 4C describes the packet processing method provided in this application, and the following describes a computing device 500 provided in this application. The computing device 500 performs the packet processing method shown in FIGS. 4A to 4C during running.

Figure 5:
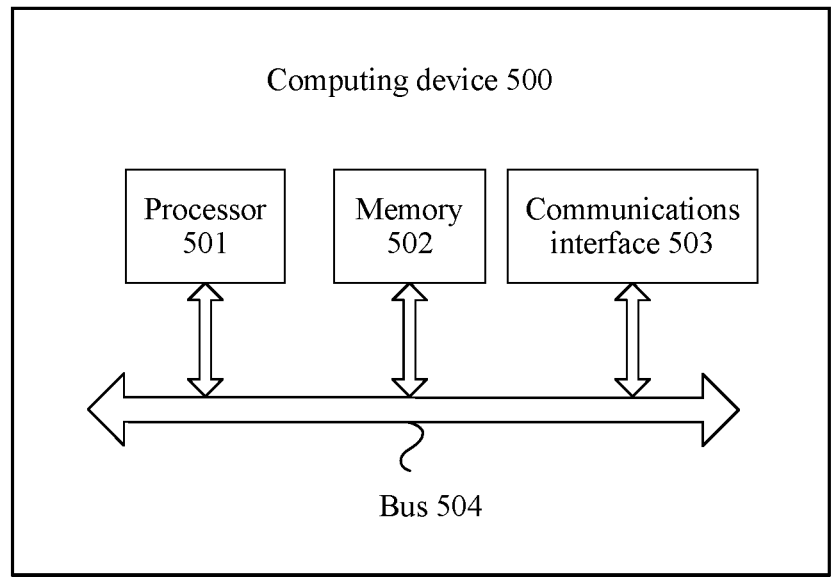
FIG. 5 is a structural diagram of an embodiment of a computing device according to this application.

As shown in FIG. 5, the computing device 500 includes a processor 501, a memory 502, and a communications interface 503. Optionally, a bus 504 is further included. The processor 501, the memory 502, and the communications interface 503 may connect to and communicate with one another using the bus 504. Certainly, communication may also be implemented by means of radio transmission or the like.

The memory 502 may include a volatile memory, for example, a random access memory (RAM), or may include a nonvolatile memory, such as a read-only memory (ROM), a flash memory, an HDD, or an SSD. Alternatively, the memory 502 may include a combination of the foregoing types of memories. When the technical solutions provided in this application are implemented using software, program code used to implement the packet processing method provided in FIG. 4A to FIG. 4C of this application may be stored in the memory 502, and executed by the processor 501.

The communications interface 503 may be a wired interface, such as a fiber distributed data interface (FDDI) or an Ethernet interface. Alternatively, the communications interface 503 may be a wireless interface, such as a wireless local area network interface.

The processor 501 may be a central processing unit (CPU), a hardware chip, or a combination of a CPU and a hardware chip. By invoking the program code in the memory 502, the processor 501 may perform the following steps of controlling the communications interface 503 to receive a first packet sent by a first switch, where the first packet belongs to a service flow that flows from a first device to a second device, determining a service chain through which the service flow passes, determining a forwarding path of the service flow according to the service chain through which the service flow passes, where the forwarding path includes one or more service nodes in the service chain, modifying the first packet to obtain a second packet, where the second packet belongs to the service flow, and a valid payload of the second packet includes a valid payload of the first packet and forwarding path indication information, generating a first flow table according to the forwarding path of the service flow, and controlling the communications interface 503 to send the first flow table to the first switch, and controlling the communications interface 503 to send the second packet to the first switch such that the first switch forwards the second packet according to the first flow table.

Optionally, by invoking the program code in the memory 502, the processor 501 is further configured to deliver a preset flow table to an intermediate switch in the forwarding path, where the intermediate switch is a switch corresponding to a non-last-hop service node in the service chain, and the preset flow table is generated according to the forwarding path, and the preset flow table is used to instruct the intermediate switch to forward the second packet.

Optionally, by invoking the program code in the memory 502, the processor 501 is further configured to control the communications interface 503 to receive a third packet sent by a second switch, where the second switch is one of the intermediate switch, the third packet is obtained by modifying the second packet by a service node corresponding to the second switch, the third packet belongs to the service flow, and a valid payload of the third packet is the same as the valid payload of the second packet, parse the valid payload of the third packet in order to obtain the forwarding path indication information carried in the valid payload, and determine the forwarding path of the service flow according to the forwarding path indication information, generate a second flow table according to the forwarding path of the service flow, and control the communications interface 503 to send the second flow table to the second switch such that the second switch forwards the third packet according to the second flow table.

Optionally, by invoking the program code in the memory 502, the processor 501 is further configured to delete the preset flow table from the second switch.

Optionally, the memory 502 further stores a device list. The device list records multiple devices. The intermediate switch is not a switch corresponding to a device listed in the device list.

Optionally, by invoking the program code in the memory 502, the processor 501 is further configured to add the service node corresponding to the second switch into the device list.

Optionally, by invoking the program code in the memory 502, the processor 501 is further configured to control the communications interface 503 to receive a fourth packet sent by a third switch, where the third switch is a switch corresponding to a last-hop service node in the service chain, a valid payload of the fourth packet is the same as the valid payload of the second packet, and the fourth packet belongs to the service flow, parse the valid payload of the fourth packet in order to obtain the forwarding path indication information carried in the valid payload, determine the forwarding path of the service flow according to the forwarding path indication information, and generate a third flow table according to the forwarding path of the service flow, and control the communications interface 503 to send the third flow table to the third switch, delete the forwarding path indication information from the valid payload of the fourth packet in order to obtain a fifth packet, and control the communications interface 503 to send the fifth packet to the third switch such that the third switch forwards the fifth packet according to the third flow table.

Optionally, a length of the forwarding path indication information is M bytes, where M is a positive integer. By invoking the program code in the memory 502, the processor 501 is further configured to extend M bytes at an end of the valid payload of the first packet, and fill the forwarding path indication information into the extended M bytes in order to obtain the second packet, or fill the forwarding path indication information into M bytes at an end of the valid payload of the first packet in order to obtain the second packet.

Optionally, the forwarding path indication information includes identity information of the service chain.

Optionally, the forwarding path indication information further includes a tenant identity of the service flow.

Optionally, the forwarding path indication information further includes 5-tuple information of the service flow.

Optionally, by invoking the program code in the memory 502, the processor 501 is further configured to modify a destination MAC address of the first packet to a MAC address of a first-hop service node in the service chain.

Optionally, by invoking the program code in the memory 502, the processor 501 is further configured to modify a destination MAC address of the fourth packet to a MAC address of the second device.

Optionally, the memory 502 further stores a layer 7 node list. The layer 7 node list records one or more layer 7 service nodes. The layer 7 service node is a service node that bears a layer 7 service. A switch corresponding to a previous-hop service node of the layer 7 service node is referred to as a previous-hop switch. The intermediate switch is not the previous-hop switch. By invoking the program code stored in the memory 502, the processor 501 is further configured to control the communications interface 503 to receive a first target packet sent by the previous-hop switch, where the first target packet belongs to the service flow, and a valid payload of the first target packet is the same as the valid payload of the second packet, parse the valid payload of the first target packet in order to obtain the forwarding path indication information carried in the valid payload, determine the forwarding path of the service flow according to the forwarding path indication information, generate a target flow table according to the forwarding path of the service flow, and control the communications interface 503 to send the target flow table to the previous-hop switch, delete the forwarding path indication information from the valid payload of the first target packet in order to obtain a second target packet, and send the second target packet to the previous-hop switch such that the previous-hop switch forwards the second target packet according to the target flow table.

For detailed description of the computing device 500 shown in FIG. 5, refer to the packet processing method shown in FIG. 4A to FIG. 4C. Details are not described herein again.

This application further provides a packet processing apparatus configured to implement the packet processing method provided in the embodiment shown in FIG. 4A to FIG. 4C.

Figure 6:
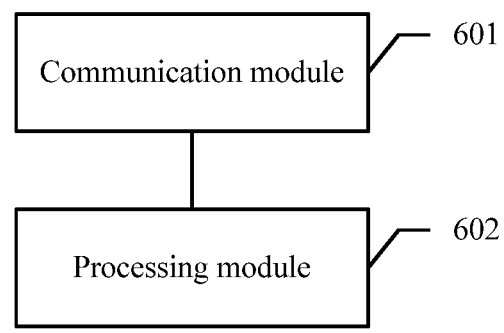
FIG. 6 is a structural diagram of an embodiment of a packet processing apparatus according to this application.

Referring to FIG. 6, the packet processing apparatus provided in this application includes a communication module 601 and a processing module 602. In an implementation, the communication module 601 may be a physical interface, for example, a wired interface such as an FDDI or an Ethernet interface, or may be a wireless interface such as a wireless local area network interface. The processing module 602 may be a CPU, a hardware chip, or a combination of a CPU and a hardware chip. In another implementation, the communication module 601 and the processing module 602 may be software modules.

The communication module 601 is configured to receive a first packet sent by a first switch, where the first packet belongs to a service flow that flows from a first device to a second device.

The processing module 602 is configured to determine a service chain through which the service flow passes, determine a forwarding path of the service flow according to the service chain through which the service flow passes, where the forwarding path includes one or more service nodes in the service chain, modify the first packet to obtain a second packet, where the second packet belongs to the service flow, and a valid payload of the second packet includes a valid payload of the first packet and forwarding path indication information, and generate a first flow table according to the forwarding path of the service flow.

The communication module 601 is further configured to send the first flow table to the first switch, and send the second packet to the first switch such that the first switch forwards the second packet according to the first flow table.

Optionally, the communication module 601 is further configured to deliver a preset flow table to an intermediate switch in the forwarding path, where the intermediate switch is a switch corresponding to a non-last-hop service node in the service chain, the preset flow table is generated according to the forwarding path, and the preset flow table is used to instruct the intermediate switch to forward the second packet.

Optionally, the communication module 601 is further configured to receive a third packet sent by a second switch, where the second switch is one of the intermediate switch, the third packet is obtained by modifying the second packet by a service node corresponding to the second switch, the third packet belongs to the service flow, and a valid payload of the third packet is the same as the valid payload of the second packet.

The processing module 602 is further configured to parse the valid payload of the third packet in order to obtain the forwarding path indication information carried in the valid payload, and determine the forwarding path of the service flow according to the forwarding path indication information, and generate a second flow table according to the forwarding path of the service flow.

The communication module 601 is further configured to send the second flow table to the second switch such that the second switch forwards the third packet according to the second flow table.

Optionally, the processing module 602 is further configured to delete the preset flow table from the second switch.

Optionally, the processing module 602 is further configured to add the service node corresponding to the second switch into a device list.

Optionally, a device list is set on the packet processing apparatus. The device list records multiple devices. The intermediate switch is not a switch corresponding to a device listed in the device list.

Optionally, the communication module 601 is further configured to receive a fourth packet sent by a third switch, where the third switch is a switch corresponding to a last-hop service node in the service chain, a valid payload of the fourth packet is the same as the valid payload of the second packet, and the fourth packet belongs to the service flow.

The processing module 602 is further configured to parse the valid payload of the fourth packet in order to obtain the forwarding path indication information carried in the valid payload, and determine the forwarding path of the service flow according to the forwarding path indication information, and generate a third flow table according to the forwarding path of the service flow.

The communication module 601 is further configured to send the third flow table to the third switch.

The processing module 602 is further configured to delete the forwarding path indication information from the valid payload of the fourth packet in order to obtain a fifth packet.

The communication module 601 is further configured to send the fifth packet to the third switch such that the third switch forwards the fifth packet according to the third flow table.

Optionally, a length of the forwarding path indication information is M bytes, where M is a positive integer. The processing module 602 is further configured to extend M bytes at an end of the valid payload of the first packet, and fill the forwarding path indication information into the extended M bytes in order to obtain the second packet, or fill the forwarding path indication information into M bytes at an end of the valid payload of the first packet in order to obtain the second packet.

Optionally, the forwarding path indication information includes identity information of the service chain.

Optionally, the forwarding path indication information further includes a tenant identity of the service flow.

Optionally, the forwarding path indication information further includes 5-tuple information of the service flow.

Optionally, the processing module 602 is further configured to modify a destination MAC address of the first packet to a MAC address of a first-hop service node in the service chain.

Optionally, the processing module 602 is further configured to modify a destination MAC address of the fourth packet to a MAC address of the second device.

Optionally, a layer 7 node list is further set on the packet processing apparatus. The layer 7 node list records one or more layer 7 service nodes. The layer 7 service node is a service node that bears a layer 7 service. A switch corresponding to a previous-hop service node of the layer 7 service node is referred to as a previous-hop switch. The intermediate switch is not the previous-hop switch. The communication module 601 is further configured to receive a first target packet sent by the previous-hop switch, where the first target packet belongs to the service flow, and a valid payload of the first target packet is the same as the valid payload of the second packet.

The processing module 602 is further configured to parse the valid payload of the first target packet in order to obtain the forwarding path indication information carried in the valid payload, and determine the forwarding path of the service flow according to the forwarding path indication information, and generate a target flow table according to the forwarding path of the service flow.

The communication module 601 is further configured to send the target flow table to the previous-hop switch.

The processing module 602 is further configured to delete the forwarding path indication information from the valid payload of the first target packet in order to obtain a second target packet.

The communication module 601 is further configured to send the second target packet to the previous-hop switch such that the previous-hop switch forwards the second target packet according to the target flow table.

For detailed description of the packet processing apparatus shown in FIG. 6, refer to the packet processing method shown in FIG. 4A to FIG. 4C. Details are not described herein again.

This application further provides a computer program product. The computer program product may be a software installation package. When a computing device runs the software installation package, the packet processing method shown in FIG. 4A to FIG. 4C is performed.

It may be clearly understood by a person skilled in the art that, for the purpose of convenient and brief description, for a detailed working process of the foregoing system, module, and unit, reference may be made to a corresponding process in the foregoing method embodiments, and details are not described herein again.

In the several embodiments provided in this application, it should be understood that the disclosed system and method may be implemented in other manners. For example, the described system embodiment is merely an example. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented using some interfaces. The indirect couplings or communication connections between the modules or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to other approaches, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a universal serial bus (USB) flash drive, a removable hard disk, a ROM, an SSD, a RAM, a magnetic disk, or an optical disc.

What is claimed is:

1. A packet processing method, applied to a software-defined networking (SDN) controller, comprising:
   receiving a first packet from a first switch, the first packet belonging to a service flow flowing from a first device to a second device;
   determining a service chain through which the service flow passes;
   determining a forwarding path of the service flow according to the service chain through which the service flow passes, the forwarding path comprising one or more service nodes in the service chain;
   modifying the first packet to obtain a second packet, the second packet belonging to the service flow, and a valid payload of the second packet comprising a valid payload of the first packet and forwarding path indication information;
   generating a first flow table according to the forwarding path of the service flow;
   sending the first flow table to the first switch; and
   sending the second packet to the first switch to enable the first switch to forward the second packet according to the first flow table.

2. The packet processing method of claim 1, further comprising delivering a preset flow table to an intermediate switch in the forwarding path, the intermediate switch corresponding to a non-last-hop service node in the service chain, and the preset flow table being generated according to the forwarding path and instructing the intermediate switch to forward the second packet.

3. The packet processing method of claim 2, further comprising:
   receiving a third packet from a second switch, the second switch being one of intermediate switches, the third packet being obtained by modifying the second packet by a service node corresponding to the second switch, the third packet belonging to the service flow, and a valid payload of the third packet being the same as the valid payload of the second packet;
   parsing the valid payload of the third packet to obtain the forwarding path indication information carried in the valid payload of the third packet;
   determining the forwarding path of the service flow according to the forwarding path indication information;
   generating a second flow table according to the forwarding path of the service flow; and
   sending the second flow table to the second switch to enable the second switch to forward the third packet according to the second flow table.

4. The packet processing method of claim 3, further comprising deleting the preset flow table from the second switch.

5. The packet processing method of claim 2, wherein a device list is set on the SDN controller, and the intermediate switch does not correspond to a device listed in the device list.

6. The packet processing method of claim 1, further comprising:
   receiving a fourth packet from a third switch, the third switch corresponding to a last-hop service node in the service chain, a valid payload of the fourth packet being the same as the valid payload of the second packet, and the fourth packet belonging to the service flow;
   parsing the valid payload of the fourth packet to obtain the forwarding path indication information carried in the valid payload of the fourth packet;
   determining the forwarding path of the service flow according to the forwarding path indication information;
   generating a third flow table according to the forwarding path of the service flow;
   sending the third flow table to the third switch;
   deleting the forwarding path indication information from the valid payload of the fourth packet to obtain a fifth packet; and
   sending the fifth packet to the third switch to enable the third switch to forward the fifth packet according to the third flow table.

7. The packet processing method of claim 1, wherein a length of the forwarding path indication information is M bytes, the M being a positive integer, and modifying the first packet to obtain the second packet comprising:
   extending M bytes at an end of the valid payload of the first packet, and filling the forwarding path indication information into extended M bytes to obtain the second packet; or
   filling the forwarding path indication information into the M bytes at the end of the valid payload of the first packet to obtain the second packet.

8. The packet processing method of claim 1, wherein the forwarding path indication information comprises identity information of the service chain.

9. The packet processing method of claim 8, wherein the forwarding path indication information further comprises a tenant identity of the service flow.

10. The packet processing method of claim 7, wherein the forwarding path indication information comprises 5-tuple information of the service flow.

11. The packet processing method of claim 7, wherein modifying the first packet to obtain the second packet further comprises modifying a destination Media Access Control (MAC) address of the first packet to a MAC address of a first-hop service node in the service chain.

12. A computing device, comprising:
a communications interface;
a memory configured to store a program code; and
a processor coupled to the communications interface and the memory, the program code causing the processor to be configured to:
  receive, using the communications interface, a first packet from a first switch, the first packet belonging to a service flow flowing from a first device to a second device;
  determine a service chain through which the service flow passes;
  determine a forwarding path of the service flow according to the service chain through which the service flow passes, the forwarding path comprising one or more service nodes in the service chain;
  modify the first packet to obtain a second packet, the second packet belonging to the service flow, and a valid payload of the second packet comprising a valid payload of the first packet and forwarding path indication information;
  generate a first flow table according to the forwarding path of the service flow;
  send, using the communications interface, the first flow table to the first switch; and
  send, using the communications interface, the second packet to the first switch to enable the first switch to forward the second packet according to the first flow table.

13. The computing device of claim 12, wherein the program code further causes the processor to be configured to deliver a preset flow table to an intermediate switch in the forwarding path, the intermediate switch corresponding to a non-last-hop service node in the service chain, and the preset flow table being generated according to the forwarding path and instructing the intermediate switch to forward the second packet.

14. The computing device of claim 13, wherein the program code further causes the processor to be configured to:
  receive, using the communications interface, a third packet from a second switch, the second switch being one of intermediate switches, the third packet being obtained by modifying the second packet by a service node corresponding to the second switch, the third packet belonging to the service flow, and a valid payload of the third packet being the same as the valid payload of the second packet;
  parse the valid payload of the third packet to obtain the forwarding path indication information carried in the valid payload of the third packet;
  determine the forwarding path of the service flow according to the forwarding path indication information;
  generate a second flow table according to the forwarding path of the service flow; and
  send, using the communications interface, the second flow table to the second switch to enable the second switch to forward the third packet according to the second flow table.

15. The computing device of claim 14, wherein the program code further causes the processor to be configured to delete the preset flow table from the second switch.

16. The computing device of claim 13, wherein the memory is further configured to store a device list, and the intermediate switch does not corresponding to a device listed in the device list.

17. The computing device of claim 12, wherein the program code further causes the processor to be configured to:
  receive, using the communications interface, a fourth packet from a third switch, the third switch corresponding to a last-hop service node in the service chain, a valid payload of the fourth packet being the same as the valid payload of the second packet, and the fourth packet belonging to the service flow;
  parse the valid payload of the fourth packet to obtain the forwarding path indication information carried in the valid payload of the fourth packet;
  determine the forwarding path of the service flow according to the forwarding path indication information;
  generate a third flow table according to the forwarding path of the service flow;
  send, using the communications interface, the third flow table to the third switch;
  delete the forwarding path indication information from the valid payload of the fourth packet to obtain a fifth packet; and
  send, using the communications interface, the fifth packet to the third switch to enable the third switch to forward the fifth packet according to the third flow table.

18. The computing device of claim 12, wherein a length of the forwarding path indication information is M bytes, the M being a positive integer, and the program code further causing the processor to be configured to:
  extend M bytes at an end of the valid payload of the first packet, and fill the forwarding path indication information into extended M bytes in order to obtain the second packet; or
  fill the forwarding path indication information into the M bytes at the end of the valid payload of the first packet to obtain the second packet.

19. The computing device of claim 12, wherein the forwarding path indication information comprises identity information of the service chain.

20. A non-transitory computer readable storage medium having computer usable program code, a computing device executing the computer usable program code to perform a method of:
  receiving a first packet from a first switch, the first packet belonging to a service flow flowing from a first device to a second device;
  determining a service chain through which the service flow passes;
  determining a forwarding path of the service flow according to the service chain through which the service flow passes, the forwarding path comprising one or more service nodes in the service chain;
  modifying the first packet to obtain a second packet, the second packet belonging to the service flow, and a valid payload of the second packet comprising a valid payload of the first packet and forwarding path indication information;

generating a first flow table according to the forwarding path of the service flow;

sending the first flow table to the first switch; and sending the second packet to the first switch to enable the first switch to forward the second packet according to the first flow table.

\* \* \* \* \*